US011753597B2

(12) United States Patent
Price et al.

(10) Patent No.: US 11,753,597 B2
(45) Date of Patent: Sep. 12, 2023

(54) PROCESS FOR PRODUCING SYNTHETIC HYDROCARBONS FROM BIOMASS

(71) Applicant: Expander Energy Inc., Calgary (CA)

(72) Inventors: Steve Price, Calgary (CA); Steve Kresnyak, Calgary (CA); Gord Crawford, Calgary (CA)

(73) Assignee: Expander Energy, Inc., Calgary (CA)

( * ) Notice: Subject to any disclaimer, the term of this patent is extended or adjusted under 35 U.S.C. 154(b) by 0 days.

(21) Appl. No.: 17/774,689

(22) PCT Filed: Nov. 6, 2020

(86) PCT No.: PCT/CA2020/051510
§ 371 (c)(1),
(2) Date: May 5, 2022

(87) PCT Pub. No.: WO2021/087618
PCT Pub. Date: May 14, 2021

(65) Prior Publication Data
US 2022/0396743 A1    Dec. 15, 2022

Related U.S. Application Data

(60) Provisional application No. 62/933,015, filed on Nov. 8, 2019.

(51) Int. Cl.
*C10J 3/72* (2006.01)
*C25B 15/08* (2006.01)
(Continued)

(52) U.S. Cl.
CPC ............... *C10J 3/72* (2013.01); *C10G 2/30* (2013.01); *C25B 1/04* (2013.01); *C25B 15/081* (2021.01);
(Continued)

(58) Field of Classification Search
CPC . C10G 2/30; C25B 1/04; C25B 15/081; C10J 3/72; C10J 2300/0909;
(Continued)

(56) References Cited

U.S. PATENT DOCUMENTS

2003/0065042 A1    4/2003  Shaw
2007/0131909 A1    6/2007  Rojey et al.
(Continued)

FOREIGN PATENT DOCUMENTS

WO    2015014459 A1    2/2015

OTHER PUBLICATIONS

International Search Report and Written Opinion issued in International Application No. PCT/CA2020/051510, dated Jan. 18, 2021 (8 pages).

(Continued)

*Primary Examiner* — Jafar F Parsa
(74) *Attorney, Agent, or Firm* — McNeill Baur PLLC (57) ABSTRACT

A process for preparing synthetic hydrocarbons from a biomass feedstock is provided. The process involves electrolyzing water in an electrolyzer to produce oxygen and hydrogen, using the generated oxygen to gasify a biomass feedstock under partial oxidation reaction conditions to generate a hydrogen lean syngas, adding at least a portion of the generated hydrogen to the hydrogen lean syngas to formulate hydrogen rich syngas, which is reacted a Fischer Tropsch (FT) reactor to produce the synthetic hydrocarbons and water. At least a portion of the water produced in the FT reaction is recycled for use in the electrolysis step, and optionally using heat generated from the FT reaction to dry the biomass feedstock.

20 Claims, 2 Drawing Sheets

(51) Int. Cl.
*C10G 2/00* (2006.01)
*C25B 1/04* (2021.01)

(52) U.S. Cl.
CPC .................. *C10J 2300/0909* (2013.01); *C10J 2300/0916* (2013.01); *C10J 2300/1659* (2013.01); *C10J 2300/1684* (2013.01)

(58) Field of Classification Search
CPC ........ C10J 2300/0916; C10J 2300/1659; C10J 2300/1684
See application file for complete search history.

(56) References Cited

U.S. PATENT DOCUMENTS

| | | |
|---|---|---|
| 2010/0076097 A1 | 3/2010 | Metz et al. |
| 2013/0345325 A1 | 12/2013 | Lecomte et al. |
| 2015/0275112 A1 | 10/2015 | Boissonnett et al. |

OTHER PUBLICATIONS

PCT Demand for International Preliminary Examination and Response to Written Opinion and Amendment Under Article 34 in Application No. PCT/CA2020/051510, dated Sep. 8, 2021 (25 pages).
Written Opinion of the International Preliminary Examining Authority issued in International Application No. PCT/CA2020/051510, dated Nov. 26, 2021 (4 pages).
International Preliminary Report on Patentability in PCT/CA2020/051510, dated Mar. 1, 2022 (21 pages).

PROCESS FOR PRODUCING SYNTHETIC HYDROCARBONS FROM BIOMASS

CROSS REFERENCE TO RELATED APPLICATIONS

This application is a national phase entry pursuant to 35 U.S.C. § 371 of International Application No. PCT/CA2020/051510, filed Nov. 6, 2020, which claims the benefit of priority of United States Provisional Patent Application No. 62/933,015, filed Nov. 8, 2019, each of which is incorporated by reference herein in its entirety for any purpose.

FIELD OF THE INVENTION

The present invention pertains to the field of the production of synthetic hydrocarbons from renewable and/or low carbon sources.

BACKGROUND OF THE INVENTION

The carbon-based fossil fuels such as coal, oil and natural gas are non-renewable resources and of limited supply. Combustion of fossil fuel has caused a rise in atmospheric carbon dioxide concentrations, which are believed to contribute to global climate change. The concern for carbon emissions from fossil fuels has created an increased interest in the development of synthetic fuel sources.

Biofuels are considered viable alternatives to fossil fuels for several reasons. Biofuels are renewable energy sources produced from biomass. One of the advantageous features of the biomass to fuel technology is that it presents a possibility to not only formulate a less carbon intensive product, but also make use of waste biomass materials, such as forestry by products, construction and other wood waste products, human waste products, or agriculture feedstocks, byproducts and waste products.

The Fischer-Tropsch (FT) process converts hydrogen and carbon monoxide (commonly known as syngas) into liquid hydrocarbons, examples of which include synthetic diesel, naphtha, kerosene, aviation or jet fuel and paraffinic wax. For an effective FT reaction, the molar ratio of the $H_2$:CO in the syngas is required to be approximately 2:1.

Several biomass to liquid processes have been developed, that involve thermal gasification of biomass to generate syngas and utilizing same in the FT reaction.

As is well known the art, gasification of biomass results in a hydrogen lean syngas having $H_2$:CO molar ratio of approximately 1:1. As a result, biomass to liquid processes involving the FT reaction require the incorporation of water gas shift (WGS) reaction, or generation of separate hydrogen rich syngas streams using gas/methane reformers, such as a steam methane reformer (SMR) and/or an autothermal reformer (ATR), to supplement the hydrogen lean syngas.

Historically, water gas shift (WGS) processing has been used, but this process is extremely wasteful and uneconomic. The water gas shift reaction is a shift from the CO to $CO_2$ to create a hydrogen rich syngas, which involves adding water vapor to the hydrogen lean syngas, wherein water reacts with carbon monoxide to form carbon dioxide and hydrogen. The WGS reaction therefore requires heat and generates undesirable $CO_2$.

Reforming of natural gas via SMR and/or ATR also requires heat addition for combustion of natural gas, a non-renewable resource.

A Biomass to Liquids (BTL) process such as disclosed in WO2012106795 incorporates biomass gasification and natural gas reforming to provide hydrocarbon liquid products with lower carbon intensity (CI) than petroleum fuels (reduction of over 40%). However, this process is also dependent upon non-renewable feedstock (i.e. natural gas).

Integration of biomass gasification and water electrolysis has been used for the production of hydrogen, wherein water electrolysis is conducted to supply oxygen for a biomass gasifier and the side stream of hydrogen is used to supplement the pure hydrogen stream from the gasifier. The process involves a water gas shift reaction to convert hydrogen lean syngas obtained from a gasifier into a hydrogen rich syngas, which results in the production of $CO_2$, which is rejected to atmosphere (International Journal of Hydrogen Energy 34 (2009) 772-782). This article also concluded that use of electrolysis for hydrogen production is not cost effective.

Integration of biomass gasification and water electrolysis to generate a hydrogen rich syngas has been disclosed by McKellar et al., in International Mechanical Engineering Congress and Exposition, Oct. 31-Nov. 6, 2008. The process disclosed in this article involves high temperature steam hydrolysis to produce oxygen and hydrogen, and biomass gasification to obtain hydrogen lean syngas. The overall process is fairly complicated, wherein process heat from a biomass gasifier is used to improve the efficiency of the steam electrolysis process. This article also discloses that the process efficiency can vary significantly depending on biomass inputs and gasifier temperature and efforts to increase efficiency results in the formation of more $CO_2$.

Accordingly, there is a need for an improved carbon efficient biomass to liquids (BTL) process for producing synthesized hydrocarbons, which does not depend on non-renewable feedstock, and which can utilize renewable and/or low carbon energy to produce oxygen for biomass oxidation and produce hydrogen for supplementing the hydrogen lean syngas obtained from biomass.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a process for production of synthetic hydrocarbons from renewable and/or low carbon sources.

In accordance with an aspect of the present invention, there is provided a process for preparing synthetic hydrocarbons from a biomass feedstock, which comprises:
a) electrolyzing water in an electrolyzer to produce oxygen and hydrogen;
b) feeding the $O_2$ generated in step a), and the biomass feedstock into a gasifier, and gasifying the feedstock under partial oxidation reaction conditions to generate a hydrogen lean syngas having $H_2$:CO ratio of about 1:1;
c) adding at least a portion of the $H_2$ generated in step a) to the hydrogen lean syngas generated in step b) to formulate hydrogen rich syngas having $H_2$:CO ratio of about 2:1;
d) reacting the hydrogen rich syngas in a Fischer Tropsch (FT) reactor to produce the synthetic hydrocarbons and water;
e) recycling at least a portion of the water produced in step d) for use in step a).

BRIEF DESCRIPTION OF THE FIGURES

The invention will now be described by way of an exemplary embodiment with reference to the accompanying simplified, flow diagrams. In the drawings.

DETAILED DESCRIPTION OF THE INVENTION

Unless defined otherwise, all technical and scientific terms used herein have the same meaning as commonly understood by one of ordinary skill in the art to which this invention belongs.

As used herein, the term "syngas" is an abbreviation for "synthesis gas", which is a mixture comprising hydrogen, carbon monoxide, and some carbon dioxide.

As used herein, the term "hydrogen lean syngas" refers to syngas having $H_2$:CO molar ratio of about 1:1, such as 0.5:1 to 1.2:1.

As used herein, the term "hydrogen rich syngas" refers to syngas having $H_2$:CO molar ratio of about 2:1, such as 1.8:1 to 2.2:1, which is desired optimum ratio for use in Fischer-Tropsch reaction.

As used herein, the term "electrolysis" refers to the process of using electricity to split water into hydrogen and oxygen.

As used herein, the term "about" refers to a +/−10% variation from the nominal value. It is to be understood that such a variation is always included in a given value provided herein, whether or not it is specifically referred to.

The present invention relates to a process for production of synthetic hydrocarbon from low carbon and/or renewable sources, i.e. biomass, water and electricity.

The present application provides an improved biomass to liquid process for preparing synthetic hydrocarbons, which utilizes low carbon and/or renewable energy to produce oxygen and hydrogen, wherein the oxygen is utilized for efficient operation of the biomass gasifier and the hydrogen is utilized for the production of a tar free hydrogen rich syngas suitable for Fischer Tropsch (FT) conversions to obtain synthetic hydrocarbons, including transportation fuels.

The inventors of the present application have found that integration of electrolysis, biomass gasification, and FT reaction for production of synthetic hydrocarbons results in near stoichiometric conditions, wherein substantially all of the hydrogen and oxygen generated via electrolysis is efficiently consumed in the process, and recycling of water generated in the FT reaction, along with optionally recycling excess heat from the FT reactor, and optionally recycling excess heat from the electrolyzer, gasifier, and/or recycling of refinery gas in to the process surprisingly results in highly carbon efficient and economically viable process despite seemingly large electrical energy requirements.

The process of the present application does not include the water gas shift reaction or natural gas reforming, thereby reducing the carbon foot print and dependence on non-renewable feedstocks (e.g. natural gas). Low carbon renewable hydro/solar/wind sourced electricity (which is plentiful and inexpensive in many regions) or low carbon nuclear electricity can be utilized to eliminate the need for a non-renewable source, such as natural gas.

The process of the present invention involves electrolysis of water in an electrolyzer to produce oxygen and hydrogen. The oxygen generated via the water electrolysis is used for partial oxidation of a biomass feedstock in a gasifier to generate a hydrogen lean syngas. At least a portion of the hydrogen generated via the water electrolysis is added to the hydrogen lean syngas to formulate a hydrogen rich syngas. The hydrogen rich syngas is then reacted in a Fischer Tropsch (FT) reactor to produce synthetic hydrocarbons and water. The water generated during the FT reaction is recycled to the electrolysis step, thereby reducing/minimizing the amount of water required from an external source, eventually using the recycled water as primary source for the electrolysis process.

Any suitable electrolyzer can be selected to conduct the electrolysis step. A suitable temperature and/or pressure for the electrolysis is selected as appropriate for the type of electrolyzer used.

In some embodiments, the electrolysis step can be carried out at a temperature from about 25° C. to about 1000° C. In some embodiments, the electrolysis step is carried out at temperature about 50° C. to about 850° C. In some embodiments, the electrolysis step is carried out at temperature about 75° C. to about 100° C.

In some embodiments, the electrolysis step can be carried out a pressure up to 50 bar.

In some embodiments, the process comprises removing excess moisture from the biomass feedstock to achieve a desired water content level prior to feeding the feedstock to the gasifier. Excess moisture from the biomass feedstock can be removed by subjecting the initial feedstock to a biomass dryer.

The Fischer-Tropsch (FT) reaction is a highly exothermic reaction. At least a portion of energy/heat from the FT reaction, typically in the form of steam, is used in the process described herein, to remove excess moisture from the biomass feedstock, and optionally to generate power/electricity.

In some embodiments, the process comprises feeding at least a portion of the steam generated during the FT reaction to recover heat, which is then used to remove excess moisture from the biomass feedstock.

In some embodiments, the process comprises feeding at least a portion of steam generated in the FT reaction to an electricity generator to produce electricity which can be used to supplement electricity for the electrolyzer, and the residual heat after power generation is used to remove excess moisture from the biomass feedstock.

In some embodiments, the refinery gas generated in the FT reaction is recycled to the biomass dryer for removing excess moisture from the biomass feedstock.

As is known in the art, electrolysis processes result in generation of heat, which can be recovered. In some embodiments, the process comprises recycling at least a portion of the heat generated in the electrolysis step for removing excess moisture from the biomass feedstock. In some embodiments, a portion of the heat generated in the electrolysis step can be used for generating power for the electrolyzer.

Waste heat from the electrolysis step can be captured through organic Rankine cycle (ORC) and/or Sterling cycle generator technology.

Gasification of biomass results in generation of hot raw syngas, which can be fed to a steam-generating heat exchanger to produce steam and a cooled raw syngas. In some embodiments, the process comprises utilizing the steam generated in the heat exchanger to produce electricity to operate the electrolyzer, thereby reducing the amount of electricity from the external source.

In some embodiments, the process further comprises recycling/utilizing at least a portion of the excess heat generated during the gasification step for removing excess moisture from the biomass feedstock.

The synthesized hydrocarbons formulated via the FT reaction can be fractionated to obtain a desired product, such as naphtha, diesel, jet fuel, etc.

In some embodiments, the refinery gas formed during fractionation process is recycled to the biomass dryer for removing excess moisture from the biomass feedstock.

In some embodiments, the heat from the FT reaction, heat from the gasification reaction and the refinery gas generated in the FT-reaction and/or the fractionation process are recycled to the biomass dryer for removing excess moisture from the biomass feedstock.

In some embodiments, the refinery gas from the FT reaction and/or fractionation process can be used in an internal combustion engine or micro-turbine to generate power for electrolyzer. The waste heat from the internal combustion engine can be captured via organic Rankine cycle technology.

In some embodiments, the hydrogen lean syngas obtained from the gasifier is subjected to cleaning operation(s) prior to use in the FT reaction to remove syngas contaminants, such as tars, nitrogen based compounds ($NH_3$, HCN, etc.), sulfur based compounds ($H_2S$, COS, etc.), hydrogen halides (HCl, HF, etc.) and trace metals (Na, K, etc.). Such cleaning operations involve scrubbing units and guard units known to those skilled in the art to create a relatively clean syngas suitable for use in a Fischer-Tropsch unit.

In some embodiments, the raw hydrogen lean syngas obtained directly from the gasification of biomass feedstock or after the cleaning operation, is treated to a carbon dioxide removal operation prior to reaction in the FT-reactor. In some embodiments, the separated carbon dioxide is fed to the gasifier as blanket/sealing gas to prevent air ingress.

Synthetic hydrocarbons obtained from the FT reaction can be subjected to hydroprocessing operation(s) to further upgrade the products. The hydroprocessing operation(s) include operations such as hydrocracking, thermal cracking, hydrotreating, isomerization or combinations thereof.

In some embodiments, a portion of the hydrogen generated in the electrolysis step is fed to the hydroprocessing operation.

The hydrocarbons recovered from the hydroprocessing operation(s) can be further fractionated to obtain products such as naphtha, diesel, kerosene, jet fuel, lube oil, and wax.

The combined unit comprising hydroprocessor and hydrocarbon fractionator is commonly known as the hydrocarbon upgrader. As is known by those skilled in the art, several hydrocarbon treatment methods can form part of an upgrader unit depending on the desired refined products, which are essentially free of sulfur. The resulting diesel may be used to produce environmentally friendly, sulfur-free fuel and/or blending stock for fuels by using as is or blending with higher sulfur fuels created from petroleum sources.

Off gases generated during hydroprocessing operation(s) can be used in power generation.

A suitable biomass feedstock for the process of the present invention includes, but is not limited to, municipal waste, wood waste, forestry waste material, waste water biomass, municipal sludge, biomass crops such as switch-grass, cattails, and short rotation crops, sewage biomass, agricultural waste (crop residues, livestock by-products, etc.), agricultural by-products, industrial fibrous material, harvested fibrous material or any mixture thereof.

The process of the present invention can incorporate any gasifier known in the relevant art, such as disclosed in U.S. Pat. No. 7,776,114. Preferably, the process of the present invention involves use of the gasifier described in Applicant's PCT Publication No. WO 2018/058252, which is incorporated herein in its entirety.

Examples of suitable FT reactors include fixed bed reactors and slurry-bubble reactors, such as tubular reactors, and multiphase reactors with a stationary catalyst phase.

The term "hydrocracking" used herein refers to the splitting of an organic molecule and adding hydrogen to the resulting molecular fragments to form multiple smaller hydrocarbons (e.g., $C_{10}H_{22}+H_2 \rightarrow CH_{10}$ and skeletal isomers+$C_6H_{14}$). Since a hydrocracking catalyst may be active in hydroisomerization, skeletal isomerization can occur during the hydrocracking step. Accordingly, isomers of the smaller hydrocarbons may be formed. Hydrocracking a hydrocarbon stream derived from Fischer-Tropsch synthesis preferably takes place over a hydrocracking catalyst comprising a noble metal or at least one base metal, such as cobalt, platinum, cobalt-molybdenum, cobalt-tungsten, nickel-molybdenum, or nickel-tungsten, at a temperature of from about 550° F. to about 750° F. (from about 288° C. to about 400° C.) and at a hydrogen partial pressure of about 500 psia to about 1,500 psia (about 3,400 kPa to about 10,400 kPa).

To gain a better understanding of the invention described herein, the following examples are set forth. It will be understood that these examples are intended to describe illustrative embodiments of the invention and are not intended to limit the scope of the invention in any way.

EXAMPLES

Example 1

Figure 1:
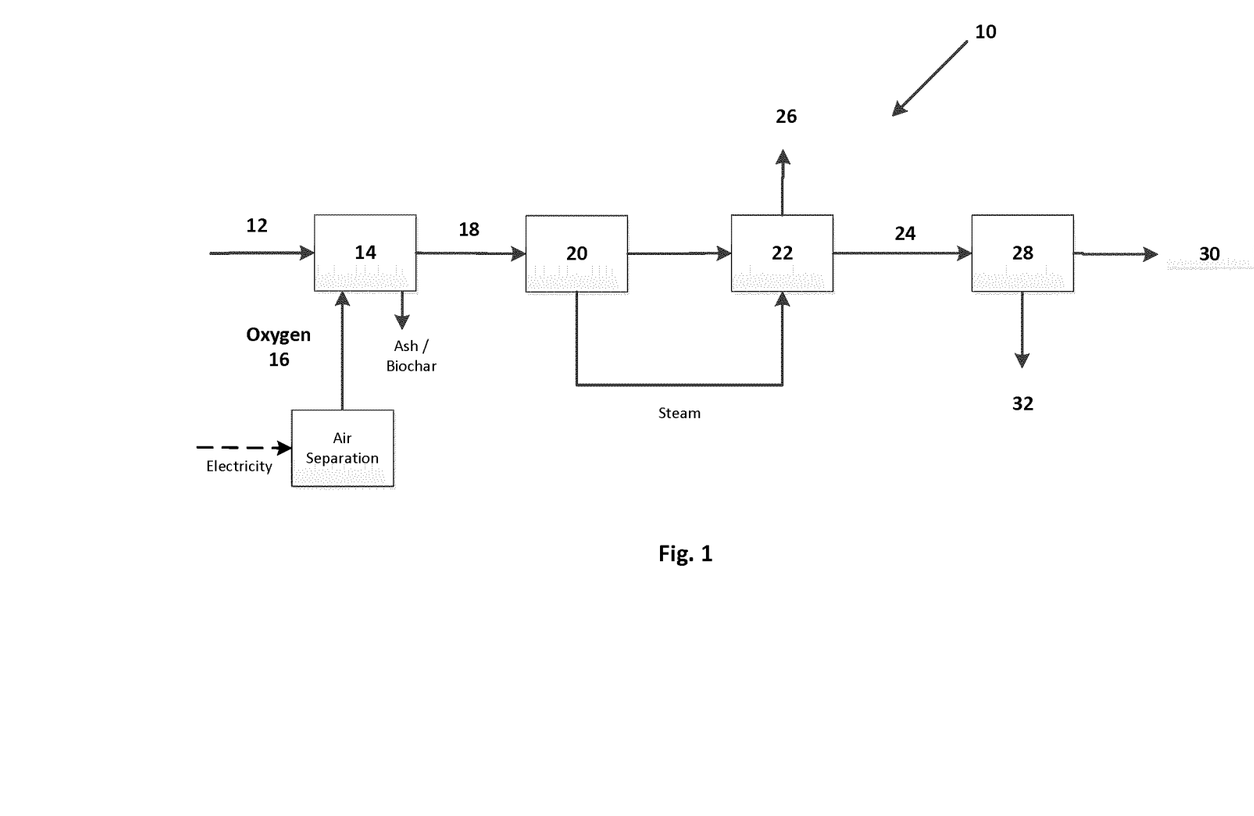
FIG. 1 depicts a flow diagram of a conventional biomass to liquids process.

Referring now to FIG. 1, shown is a process flow diagram of a circuit for prior art gasifying biomass. The process is generally denoted by numeral 10 and begins with a biomass feedstock 12. The biomass is then treated in a gasifier 14 to which oxygen 16 is added as required. As is known, the gasifier generates a hydrogen lean/deficient synthesis gas (syngas) 18 having $H_2$:Co molar ratio about 1:1, which is optionally subjected to cleaning operations 20 with subsequent water gas shift reaction in unit 22 to form hydrogen rich syngas 24 and carbon dioxide 26, which is rejected to atmosphere or collected.

The hydrogen rich syngas 24 is then transferred to a Fischer-Tropsch reactor 28 to produce the hydrocarbons/FT liquids 30 and water 32. The resulting hydrocarbons are then passed on to a hydrocarbon cracking stage (not shown) to obtain the desired hydrocarbon products, such as naphtha, diesel etc. The diesel formulated in this process is commonly known as synthetic diesel. In addition, an external source of hydrogen is supplemented to the Fischer-Tropsch unit (not shown) and the hydrocarbon cracking unit.

Example 2

Figure 2:
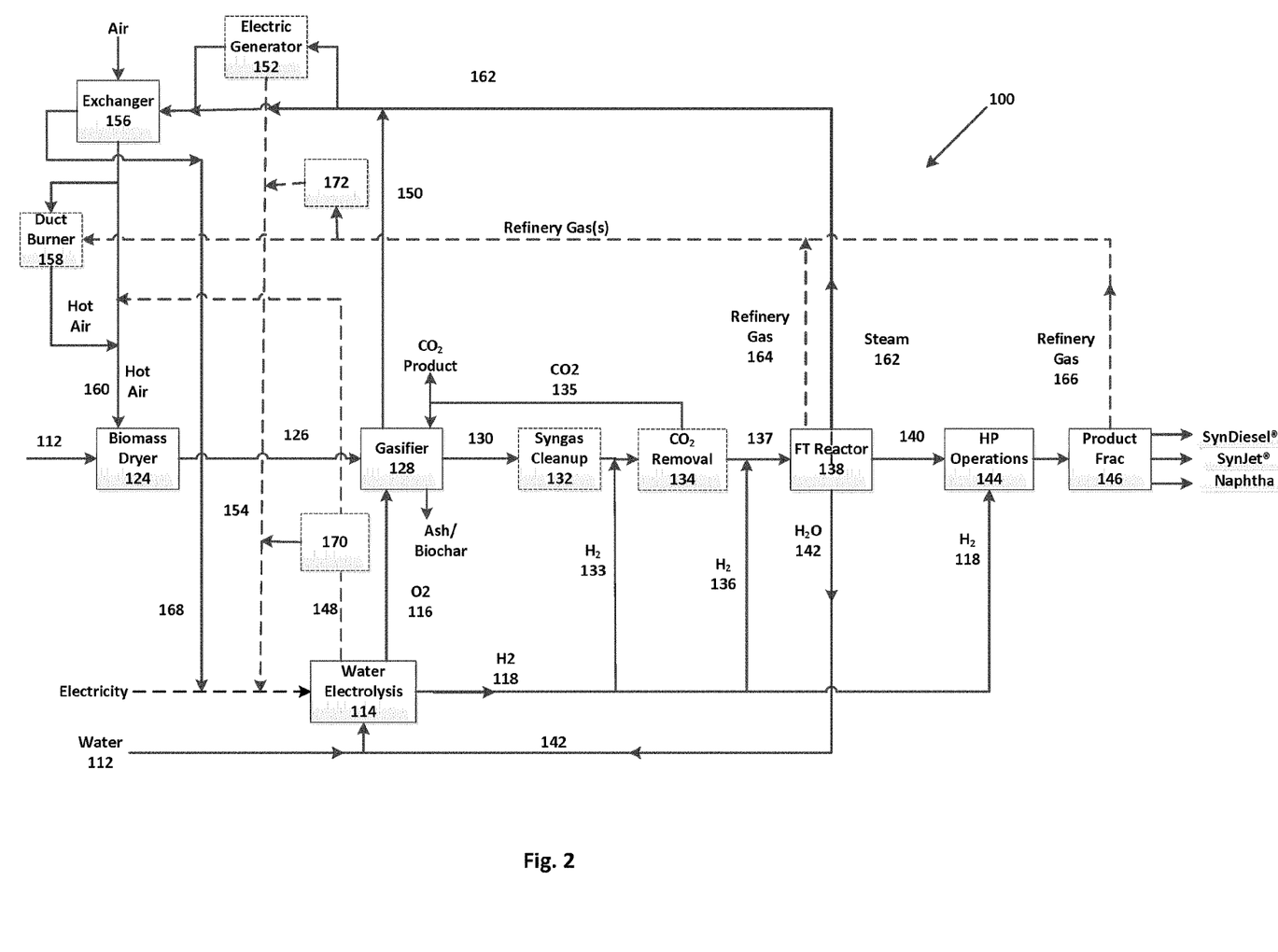
FIG. 2 depicts a flow diagram of a biomass to liquids process in accordance with an embodiment of the present invention.

FIG. 2 depicts a flow diagram of an embodiment of the process of the present invention. The process is generally denoted by numeral 100 and begins with electrolyzing water 112 in water electrolyzer 114 to generate oxygen 116 and hydrogen 118, and feeding a biomass feedstock 120 to a biomass dryer 124 to remove excess moisture to obtain a drier biomass feedstock 126 having water content about 15%. The biomass feedstock 126 and oxygen 116 are then fed to gasifier 128, and the feedstock is gasified under partial oxidation conditions to generate a hydrogen lean syngas 130 having $H_2$:CO molar ratio about 1:1. The hydrogen lean syngas 130 is optionally subjected to cleaning operations 132 and/or carbon dioxide removal operation 134 to remove $CO_2$ 135. The $CO_2$ 135 is optionally fed to the gasifier 128 to be used as blanket/sealing gas.

At least a portion of hydrogen 118 generated via water electrolysis 114 is added to the hydrogen lean syngas 130 after the cleaning operations via line 133, and/or after carbon dioxide removal operation via line 136, to form hydrogen rich syngas 137. The hydrogen rich syngas 137 is then reacted in a Fischer-Tropsch reactor 138 to produce hydrocarbons 140 and water 142. Hydrocarbons 140 are then subjected to hydroprocessing operation(s) 144, followed by product fractionation 146 to obtain the desired hydrocarbon products, such as naphtha, diesel etc. Water 142 is recycled to the electrolyzer 114, and is used as primary water source for electrolysis.

Energy/heat from the FT reactor 138, typically in the form of steam 162 from the FT reactor, is then used to remove excess moisture from the biomass feedstock and/or to generate electricity for the electrolyzer.

The steam 162 is passed through heat exchanger 156 to recover heat which is directed via line 160 to the biomass dryer 124 to supplement the heat used in the excess moisture.

Alternatively, steam from the FT reactor 138 is directed via line 162 to power generator 152 to produce electricity 154 to supplement electricity for the electrolyzer 114, and a portion of the residual steam after power generation is passed through the heat exchanger 156 to obtain residual heat which is directed via line 160 to the biomass dryer 124 to supplement the heat used in the excess moisture removal process, and recovery water which is directed via line 168 to water electrolyzer 114.

At least a portion of heat generated during the electrolysis process is optionally directed via line 148 to the biomass dryer 124 to supplement the heat used in the excess moisture removal process. In addition, a portion of excess steam generated in the gasifier 128 is optionally directed via line 150 to power generator 152 to produce electricity 154 to supplement electricity for the electrolyzer 114, and a portion of the residual steam after power generation is passed through a heat exchanger 156 to obtain residual heat which is directed via line 160 to the biomass dryer 124 to supplement the heat used in the excess moisture removal process, and recovery water which is directed via line 168 to water electrolyzer 114.

In addition, refinery gases 164 and 166, generated during FT reaction and product fractionation respectively, are used to fire duct burner 158 for biomass dryer 124, thereby using them for removing excess moisture from the biomass feedstock.

Optionally, a portion of waste heat from the electrolysis step is captured through Organic Rankine Cycle (ORC) and/or Sterling cycle generator 170 to produce electricity 154 to supplement electricity for the electrolyzer 114.

Optionally, the refinery gas 164 from the FT reaction and/or the refinery gas 166 from the fractionation process is used in an internal combustion engine or micro-turbine 172 to generate power for electrolyzer. The waste heat from the internal combustion engine is captured via ORC technology and/or Sterling cycle generator to produce additional electricity.

Although the invention has been described with reference to certain specific embodiments, various modifications thereof will be apparent to those skilled in the art without departing from the spirit and scope of the invention. All such modifications as would be apparent to one skilled in the art are intended to be included within the scope of the following claims.

The embodiments of the invention for which an exclusive property or privilege is claimed are defined as follows:

1. A process for preparing synthetic hydrocarbons from a partially dried biomass feedstock, comprising:
    a) electrolyzing water in an electrolyzer to produce oxygen, hydrogen and heat;
    b) feeding the oxygen generated in step a), and the partially dried biomass feedstock into a gasifier, and gasifying the feedstock under partial oxidation reaction conditions to generate a hydrogen lean syngas having $H_2$:CO ratio of about 1:1 and heat;
    c) adding at least a portion of the hydrogen generated in step a) to the hydrogen lean syngas generated in step b) to formulate hydrogen rich syngas having $H_2$:CO ratio of about 2:1;
    d) reacting the hydrogen rich syngas in a Fischer Tropsch (FT) reactor to produce the synthetic hydrocarbons, refinery gas, water, and heat;
    e) recycling at least a portion of the water produced in step d) for use in step a); and
    f) recycling at least a portion of the refinery gas generated in step d) to an electricity generator to produce electricity to supplement electricity for the electrolyzer.

2. The process of claim 1, wherein the process further comprises removing excess moisture from a biomass feedstock to obtain the partially dried biomass feedstock.

3. The process of claim 2, further comprising recycling at least a portion of heat generated in step d) to the step of removing excess moisture from the biomass feedstock.

4. The process of claim 2, further comprising recycling at least a portion of heat generated in step a) to the step of removing excess moisture from the biomass feedstock.

5. The process of claim 2, further comprising recycling at least a portion of excess heat generated in step b) for removing excess moisture from the biomass feedstock.

6. The process of claim 1, wherein the heat obtained from step b) is in the form of steam, and the process further comprises recycling at least a portion of the steam to an electricity generator to produce electricity to supplement electricity for the electrolyzer.

7. The process of claim 1, wherein the heat obtained from step d) is in the form of steam, and the process further comprises feeding at least a portion of the steam to an electricity generator to produce electricity to supplement electricity for the electrolyzer.

8. The process of claim 1, further comprising recycling the refinery gas for removing excess moisture from the biomass feedstock.

9. The process of claim 1, further comprising fractionation of the synthesized hydrocarbons, wherein a secondary refinery gas is generated in the fractionation.

10. The process of claim 9, further comprising recycling at least a portion of the secondary refinery gas to an electricity generator to produce electricity to supplement electricity for the electrolyzer.

11. The process of claim 9, further comprising recycling at least a portion of the secondary refinery gas for removing excess moisture from the biomass feedstock.

12. The process of claim 1, further including subjecting the synthesized hydrocarbons to a hydroprocessing operation.

13. The process according to claim 12, wherein the hydroprocessing operation is selected from the group consisting of hydrocracking, thermal cracking, hydrotreating, isomerization and combinations thereof.

14. The process of claim 1, wherein the hydrogen lean syngas is treated to a carbon dioxide removal operation prior to reaction in the FT-reactor.

15. The process of claim 14, wherein the separated carbon dioxide and/or steam is fed to the gasifier as blanket gas.

16. The process of claim 1, wherein the biomass feedstock comprises municipal waste, wood waste, forestry waste material, waste water biomass, sewage biomass, agricultural waste, agricultural byproducts, industrial fibrous material, harvested fibrous material or mixtures thereof.

17. The process of claim 3, further comprising recycling at least a portion of heat generated in step a) to the step of removing excess moisture from the biomass feedstock.

18. The process of claim 3, further comprising recycling at least a portion of excess heat generated in step b) for removing excess moisture from the biomass feedstock.

19. The process of claim 4, further comprising recycling at least a portion of excess heat generated in step b) for removing excess moisture from the biomass feedstock.

20. The process of claim 17, further comprising recycling at least a portion of excess heat generated in step b) for removing excess moisture from the biomass feedstock.

* * * * *

UNITED STATES PATENT AND TRADEMARK OFFICE
CERTIFICATE OF CORRECTION

| | |
|---|---|
| PATENT NO. | : 11,753,597 B2 |
| APPLICATION NO. | : 17/774689 |
| DATED | : September 12, 2023 |
| INVENTOR(S) | : Steve Price, Steve Kresnyak and Gord Crawford |

It is certified that error appears in the above-identified patent and that said Letters Patent is hereby corrected as shown below:

On the Title Page

Delete Title Page and substitute therefore with the attached title page consisting of the corrected illustrative figure(s).

In the Drawings

Delete Drawing Sheet 2 (Figure 2) and replace with the attached Drawing Sheet 2 (Figure 2).

Signed and Sealed this
Sixteenth Day of April, 2024

Katherine Kelly Vidal
*Director of the United States Patent and Trademark Office*

CERTIFICATE OF CORRECTION (continued)
U.S. Pat. No. 11,753,597 B2

(12) United States Patent
Price et al.

(10) Patent No.: US 11,753,597 B2
(45) Date of Patent: Sep. 12, 2023

(54) PROCESS FOR PRODUCING SYNTHETIC HYDROCARBONS FROM BIOMASS

(71) Applicant: Expander Energy Inc., Calgary (CA)

(72) Inventors: Steve Price, Calgary (CA); Steve Kresnyak, Calgary (CA); Gord Crawford, Calgary (CA)

(73) Assignee: Expander Energy, Inc., Calgary (CA)

( * ) Notice: Subject to any disclaimer, the term of this patent is extended or adjusted under 35 U.S.C. 154(b) by 0 days.

(21) Appl. No.: 17/774,689

(22) PCT Filed: Nov. 6, 2020

(86) PCT No.: PCT/CA2020/051510
§ 371 (c)(1),
(2) Date: May 5, 2022

(87) PCT Pub. No.: WO2021/087618
PCT Pub. Date: May 14, 2021

(65) Prior Publication Data
US 2022/0396743 A1    Dec. 15, 2022

Related U.S. Application Data

(60) Provisional application No. 62/933,015, filed on Nov. 8, 2019.

(51) Int. Cl.
*C10J 3/72*    (2006.01)
*C25B 15/08*    (2006.01)
(Continued)

(52) U.S. Cl.
CPC ............ *C10J 3/72* (2013.01); *C10G 2/30* (2013.01); *C25B 1/04* (2013.01); *C25B 15/081* (2021.01);
(Continued)

(58) Field of Classification Search
CPC . C10G 2/30; C25B 1/04; C25B 15/081; C10J 3/72; C10J 2300/0909;
(Continued)

(56) References Cited

U.S. PATENT DOCUMENTS

2003/0065042 A1    4/2003    Shaw
2007/0131909 A1    6/2007    Rojey et al.
(Continued)

FOREIGN PATENT DOCUMENTS

WO    2015014459 A1    2/2015

OTHER PUBLICATIONS

International Search Report and Written Opinion issued in International Application No. PCT/CA2020/051510, dated Jan. 18, 2021 (8 pages).
(Continued)

*Primary Examiner* — Jafar F Parsa
(74) *Attorney, Agent, or Firm* — McNeill Baur PLLC (57) ABSTRACT

A process for preparing synthetic hydrocarbons from a biomass feedstock is provided. The process involves electrolyzing water in an electrolyzer to produce oxygen and hydrogen, using the generated oxygen to gasify a biomass feedstock under partial oxidation reaction conditions to generate a hydrogen lean syngas, adding at least a portion of the generated hydrogen to the hydrogen lean syngas to formulate hydrogen rich syngas, which is reacted a Fischer Tropsch (FT) reactor to produce the synthetic hydrocarbons and water. At least a portion of the water produced in the FT reaction is recycled for use in the electrolysis step, and optionally using heat generated from the FT reaction to dry the biomass feedstock.

20 Claims, 2 Drawing Sheets

Fig. 2